United States Patent

Koizumi et al.

[11] Patent Number: 5,571,581
[45] Date of Patent: Nov. 5, 1996

[54] LONG SANDWICH MOLDED ARTICLE

[75] Inventors: Junji Koizumi; Hiroshi Mukai; Junji Takeuchi; Takahiko Sato, all of Inazawa, Japan

[73] Assignee: Toyoda Gosei Co., Ltd., Japan

[21] Appl. No.: 338,794

[22] Filed: Nov. 8, 1994

Related U.S. Application Data

[63] Continuation of Ser. No. 894,428, Jun. 5, 1992, abandoned.

[30] Foreign Application Priority Data

Jun. 14, 1991 [JP] Japan .................................. 3-143569
Jun. 14, 1991 [JP] Japan .................................. 3-170667

[51] Int. Cl.⁶ .................................................. B60R 13/04
[52] U.S. Cl. .......................... 428/31; 52/716.5; 293/128
[58] Field of Search ................... 428/31, 95; 525/211; 293/128; 52/716.5

[56] References Cited

U.S. PATENT DOCUMENTS

| | | | |
|---|---|---|---|
| 4,206,165 | 6/1980 | Dukess | 428/310.5 X |
| 4,539,171 | 9/1985 | Sorensen | 428/542.2 X |
| 4,713,419 | 12/1987 | Takimoto et al. | 525/211 |
| 4,808,450 | 2/1989 | Guy | 428/31 |
| 4,816,313 | 3/1989 | Hosokawa et al. | 428/95 X |
| 5,180,629 | 1/1993 | Terada et al. | 525/211 X |

FOREIGN PATENT DOCUMENTS

| | | |
|---|---|---|
| 216639 | 4/1987 | European Pat. Off. . |
| 265075 | 4/1988 | European Pat. Off. . |
| 61-34047 | 2/1986 | Japan . |
| 61-233048 | 10/1986 | Japan . |
| 63-95252 | 4/1988 | Japan . |
| 122299 | 4/1989 | Japan . |
| 1449022 | 9/1976 | United Kingdom . |
| 2128899 | 5/1984 | United Kingdom . |

OTHER PUBLICATIONS

W. Witt: "Polymer Blends—A Report on the Situation of Techniques", Kunststoffe, 73(1983)9, Industrial Materials and Application (Partial Translation—see Dec. 7, 1994 IDS/1449).

*Primary Examiner*—Henry F. Epstein
*Attorney, Agent, or Firm*—Cushman Darby & Cushman, L.L.P.

[57] ABSTRACT

A long molded article having a skin layer composed of a thermoplastic elastomer, and a core layer coated with said skin layer which is composed of 30 to 70% by weight of a matrix phase composed of a polypropylene resin and 70 to 30% by weight of one dispersed phase selected from the group consisting of ethylene-α-olefin copolymers and styrene-based thermoplastic elastomers. According to the present invention, there can be obtained a long molded article such as a side molding for automobile, which is excellent in attractiveness after mounting, dimensional stability, etc.

13 Claims, 4 Drawing Sheets

LONG SANDWICH MOLDED ARTICLE

This is a continuation of application Ser. No. 07/8954,428, filed on Jun. 5, 1992, which was abandoned upon the filing hereof.

BACKGROUND OF THE INVENTION

1. Field of the Invention

The present invention relates to a long sandwich molded article such as a side molding for an automobile which has excellent attractiveness after mounting, dimensional stability, etc. In particular, it relates to materials constituting the long sandwich molded article.

2. Description of the Related Art

A side molding used as the trim or exterior parts of an automobile, a ship or the like needs to fulfill many requirements. It must be attractive after mounting. It also needs dimensional stability during its use, and also to have excellent scratch resistance and product attachability.

The above term "excellent attractiveness after mounting" means that the side moldings can be affixed to the door of an automobile, or the like, leaving no space between door and molding, or that the distance between the side moldings which have been affixed is a predetermined distance.

The term "excellent dimensional stability" means that at the time of use, the side molding is not greatly expanded or contracted, for example, by the difference between temperatures in winter and summer, or daytime and nighttime.

The term "excellent scratch resistance" means that the surface of the side molding is scratch resistant during mounting or at the time of use.

The term "excellent product attachability" means that for example, in an assembly line of an automobile, the side molding can easily be attached to the automobile. For example, when the side molding is warped, it should be affixed while actively pressing it in accordance with the surface shape of a material to which the side molding is to be affixed. When the side molding is either too flexible or too stiff, it is difficult to stick. Therefore, the product attachability is poor.

For example, polypropylene resins have been used in long molded articles such as side moldings as shown for example in Japanese Patent Application Kokai Nos. 63-95252 and 61-233048. However, no one has even disclosed a long molded article which satisfies the above four requirements.

Particularly in recent years, there has been a growing demand for excellent attractiveness after mounting and dimensional stability. A reduction of the coefficient of linear expansion of the material used for the long molded article has been used to satisfy this demand. Proposed means for effecting the reduction have included blending of a fibrous filler such as glass fiber with a conventional material such as polypropylene resin as in Japanese Patent Application Kokai No. 61-34047 and Japanese Patent Application Kokoku No. 1-22299.

However, when the fibrous filler is thus blended, a long molded article obtained from the blend may have appearance defects such as warping or twist. Therefore, the attractiveness after mounting and product attachability are deteriorated.

Others have proposed using a thermoplastic elastomer having a high impact resilience as a material satisfying the demand for high scratch resistance. The thermoplastic elastomer, however, has a large coefficient of linear expansion. When used, the above-mentioned attractiveness after mounting and dimensional stability have not been satisfactory. Moreover, the whole article obtained from the thermoplastic elastomer is too flexible, and hence the product attachability is deteriorated.

In consideration of such problems with conventional moldings, the present invention was made for obtaining a long sandwich molded article which is excellent particularly in attractiveness after mounting and dimensional stability and is excellent also in scratch resistance and product attachability.

SUMMARY OF THE INVENTION

To meet these goals, the present invention relates to a long molded article comprising a skin layer composed of a thermoplastic elastomer, and a core layer coated with said skin layer which is composed of 30 to 70% by weight of a matrix phase composed of a polypropylene resin and 70 to 30% by weight of one dispersed phase selected from the group consisting of ethylene-solefin copolymers and styrene-based thermoplastic elastomers.

BRIEF DESCRIPTION OF THE DRAWINGS

These and other aspects of the invention will now be described in detail with reference to the accompanying drawings, wherein.

DETAILED DESCRIPTION OF THE PREFERRED EMBODIMENTS

Figure 1:
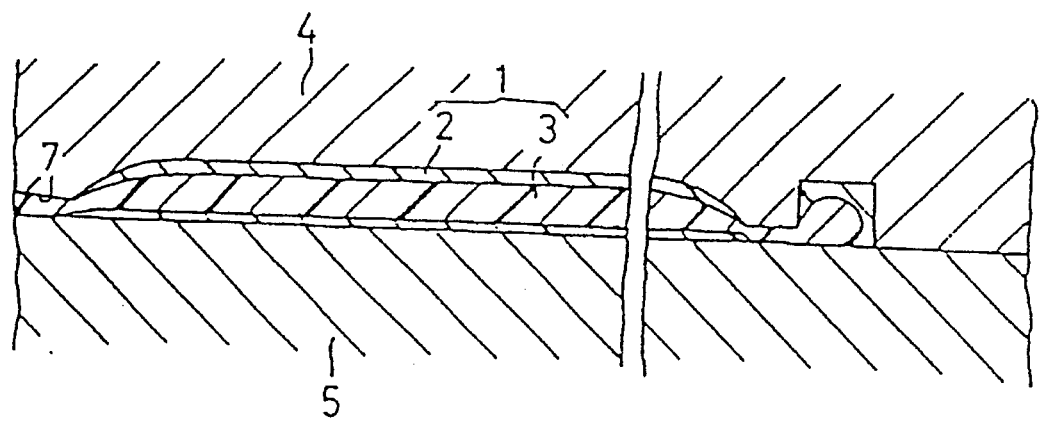
FIG. 1 is a cross-sectional view showing a side molding molded in a mold in each of Examples 1 to 3 of the present invention.

The long molded article of the present invention has a sandwich structure including an inside core layer and a skin layer which envelops the core layer so that the surface of the core layer is covered with the skin layer.

The skin layer is preferably formed of a thermoplastic elastomer. The thermoplastic elastomer is a macromolecular material whose molecule comprises a flexible component (soft segments) having rubber elasticity and a molecule-restraining component (hard segments) for preventing plastic deformation.

Thermoplastic elastomers usable in the skin layer in the present invention include, for example, the following.

(1) Styrene-based thermoplastic elastomers in which hard segments are formed from a polystyrene, and soft segments are formed from a polybutadiene, a polyisoprene, a hydrogenated polybutadiene, a hydrogenated polyisoprene or the like. These elastomers may contain polypropylene resins, oils, etc. for supplementation.

(2) Olefin-based thermoplastic elastomers in which hard segments are formed from a polypropylene or a polyethylene, and soft segments are formed from an ethylenepropylene rubber (EPR) or an ethylene-propylene-diene terpolymer (EPDM). Each of the above EPR and EPDM may be partially or completely crosslinked.

(3) Urethane-based thermoplastic elastomers in which hard segments are formed from a polyurethane, and soft segments are formed from a polyester or a polyether.

(4) Polyester thermoplastic elastomers in which hard segments are formed from a polyester, and soft segments are formed from a polyether or a polyester.

(5) Polyamide thermoplastic elastomers in which hard segments are formed from a polyamide, and soft segments are formed from a polyether or a polyester.

(6) Vinyl chloride-based thermoplastic elastomers in which hard segments are formed from crystalline PVC (polyvinyl chloride), and soft segments are formed from non-crystalline PVC.

(7) Other thermoplastic elastomers such as chlorinated polyethylenes, ionomers, syndiotactic 1,2-polybutadienes, etc.

The coefficient of linear expansion of the aforesaid thermoplastic elastomer is usually in the range of $10$–$20 \times 10^{-5}$ cm/cm·° C.

The core layer includes a polypropylene resin as a matrix phase and either an ethylene-$\alpha$-olefin copolymer or a styrene-based thermoplastic elastomer as a dispersed phase. That is, the core layer has a multi-phase structure in which the thermoplastic elastomer is dispersed in the polypropylene matrix resin. The multi-phase structure allows a low coefficient of linear expansion to be attained.

When the dispersed phase has the shape of a string having an aspect ratio of 5 or more, the coefficient of linear expansion is further reduced, so that good dimensional stability can be obtained. In the present specification, the term "aspect ratio" means the dimensional ratio of the length to the diameter of the dispersed phase.

As described above, the core layer is composed of 30% to 70% by weight of the matrix phase and the other 70% to 30% by weight of the dispersed phase. When the proportion of the dispersed phase is less than 30% by weight or more than 70% by weight, the coefficient of linear expansion of the core layer is increased.

As the aforesaid polypropylene resin, there can be used homopolypropylenes; random copolymers and block copolymers, for example, propylene-ethylene random copolymers and propylene-ethylene block copolymers; and mixtures thereof. The viscosity, polymerization degree and the like of the polypropylene resin are not critical.

The ethylene unit content of these copolymers and mixtures is preferably between 0 and 15%. When it exceeds 15%, its stiffness is deteriorated.

A polyolefin resin modified with a carboxylic acid, a carboxylic acid anhydride, or a functional group such as hydroxyl group may be used in place of a portion of the aforesaid polypropylene resin, depending on the kind of the thermoplastic elastomer for the skin layer. Use of this modified polyolefin resin improves the adhesion between the core layer and the skin layer.

This is particularly effective when the skin layer includes a polar elastomer such as polyester elastomer, polyamide elastomer, polyurethane elastomer or the like.

The ethylene-$\alpha$-olefin copolymer is a copolymer of ethylene and an $\alpha$-olefin as comonomer, such as propylene, butene-1, hexene-1, decene-1, 4-methylbutene-1, 4-methylpentene-1 or the like. Of such ethylene-$\alpha$-olefin copolymers, a copolymer obtained by using propylene as $\alpha$-olefin, i.e., ethylene-propylene rubber (EPR), has a particularly low coefficient of linear expansion.

The ethylene-$\alpha$-olefin copolymer is preferably one which has a Mooney viscosity $ML_{1+4}$ (100° C.) of less than 70. This is because when its Mooney viscosity $ML_{1+4}$ (100° C.) is preferably less than 65, more preferably less than 60.

The styrene-based thermoplastic elastomer includes, for example, styrene-ethylene-butylene-styrene block copolymers (SEBS), styrene-butadiene-styrene block copolymers (SBS), styrene-isoprene-styrene block copolymers (SIS), and styrene-ethylene-propylene copolymers (SEP).

In these elastomers, residues of a polystyrene constitute hard segments, and residues of a polybutadiene, polyisoprene, hydrogenated polybutadiene, hydrogenated polyisoprene or the like constitute soft segments.

The flexural modulus of the core layer is preferably between 2,000 and 10,000 kg/cm$^2$, more preferably 3,000 to 8,000 kg/cm$^2$, to allow optimal product attachability. Such a flexural modulus can be attained, for example, by adjusting the kind and amount added of the filler(s) hereinafter described.

It is preferable to add the filler(s) to the core layer in an amount of 1 to 40% by weight in order to adjust the hardness and stiffness of the core layer and the whole long molded article. When the amount of the filler exceeds 40% by weight, the hardness and the stiffness become too high. This is not desirable.

The filler(s) includes non-fibrous fillers such as calcium carbonate, talc, clay, mica, silica, barium sulfate, etc.; and fibrous fillers having a fiber diameter of 3 μm or less.

The fibrous fillers can be fillers in the fibrous state, such as potassium titanate whisker, magnesium oxysulfate whisker, zinc oxide whisker, wollastonite, glass fiber, carbon fiber, etc. The fibrous fillers contribute greatly to reduction of the coefficient of linear expansion by the interaction between the fibrous fillers and the aforesaid dispersed phase. Of the above-exemplified fibrous fillers, whiskers with a fiber diameter of 1 μm or less, such as potassium titanate wisker, are preferable from the viewpoint of material properties and dimensional stability.

The core layer having the composition described above has a coefficient of linear expansion of $10 \times 10^{-5}$ cm/cm·° C. or less. Its coefficient of linear expansion can be reduced to about $3 \times 10^{-5}$ cm/cm·° C. by adjustment of the aspect ratio of the dispersed phase, choice of the kind of the filler(s), and adjustment of the amount of the filler(s).

The ratio of the flexural modulus of the core layer to that of the skin layer should be 3.0 or more. When it is less than 3.0, the core layer does not effectively exhibit its linear-expansion-reducing property, so the object of the present invention cannot be achieved.

The coefficient of linear expansion of the skin layer is larger than that of the core layer. However, the linear-expansion reducing property of the core layer is predominantly exhibited by adjustment of the ratio of the flexural modulus of the core layer to that of the skin layer to 3.0 or more as described above. Therefore, the coefficient of linear expansion of the whole long molded article is reduced by the synergistic effect of the skin layer and the core layer.

That is, the coefficient of linear expansion can still be smaller than a value of coefficient of linear expansion calculated on the basis of additive effect (additivity rule) by adding the coefficient of linear expansion of the skin layer alone and that of the core layer alone. Therefore, the attractiveness after mounting and dimensional stability of the whole long molded article are improved.

The sandwich structure of the long molded article preferably has filling proportion of the core layer which is between 10 and 90%. When the filling proportion is less than 10%, the core layer is thin, and the whole long molded article becomes too flexible and tends to have a large coefficient of linear expansion. On the other hand, when the filling proportion exceeds 90%, the core layer becomes thick and the whole long molded article tends to have insufficient flexibility.

The above term "the filling proportion of the core layer" means the proportion of the area of the core layer in a section perpendicular to the longitudinal direction of the long molded article to the area of the section, which is expressed as a percentage by weight.

In the present invention, either the skin layer or the core layer may contain, besides the above components, lubricants, antistatic agents, nucleating agents, pigments, flame retardants, extenders, processing aids, etc.

The above components are mixed by melt-kneading with a kneader such as a single-screw extruder, a twin-screw extruder, a kneader, a Brabender, a Banbury mixer or the like. After the melt-kneading, the resulting mixture is usually pelletized.

The composition thus obtained is molded into a desired long molded article having a sandwich structure by sandwich injection molding, two-layer extrusion molding, or the like.

Long molded articles to which the present invention is applicable include internal and external automotive trims, etc. The above external trims include various moldings, bumpers, spoilers, rocker panels, etc. The above internal trims include pillar, garnishes, etc.

The long sandwich molded article of the present invention has a coefficient of linear expansion of as low as $2-8 \times 10^{-5}$ cm/cm·°C. Therefore it minimally expands or contracts with temperature change, so it has a high dimensional stability. Because of the high dimensional stability, also when a side molding obtained as said long sandwich molded article is affixed to the door of an automobile, the space between it and the adjacent side molding is kept narrow, and hence the side moldings are very attractive after mounting.

The surface of the long molded article includes a coat, i.e., a skin layer composed of a flexible thermoplastic elastomer. Therefore, the long molded article has a high scratch resistance.

Furthermore, the surface of the long molded article is, as described above, composed of a skin layer having a relatively high flexibility, and the inner part of the long molded article is composed of a core layer having a high flexural modulus and a high mechanical strength. Therefore, the long molded article as a whole has proper flexibility and hardness without. Accordingly, it can easily be attached in accordance with the surface shape of a material to which it is to be attached, namely, it has a high product attachability.

The reason why the long molded article as a whole has a low coefficient of linear expansion as described above is not clear. The coefficient of linear expansion of each of the skin layer and the core layer and the ratio between their values of flexural modulus are main causes of the low coefficient of linear expansion.

That is, as can be seen also from the examples described hereinafter, the skin layer composed of a thermoplastic elastomer usually has a coefficient of linear expansion of $10-20 \times 10^{-5}$ cm/cm·°C. On the other hand, in the core layer having the composition described above, a dispersed phase of an ethylene-α-olefin copolymer or a styrene-based thermoplastic elastomer is dispersed in the form of islands in a matrix phase of a polypropylene resin. The dispersed phase in the form of islands contributes greatly to reduction of the coefficient of linear expansion of the matrix phase. Therefore, the core layer has a coefficient of linear expansion of as low as $10 \times 10^{-5}$ cm/cm·°C.

Usually, the coefficient of linear expansion of a sandwich molded article as a whole is a value calculated according to an additivity rule from the values of coefficient of linear expansion of the skin layer and the core layer. The value calculated according to the additivity rule (hereinafter referred to as "additivity rule value") (CT) is a value calculated by the following equation:

$$CT = a \times CS + b \times CC$$

wherein a is the filling proportion (% by weight) of the skin layer, CS is the coefficient of linear expansion of the skin layer, b is the filling proportion (% by weight) of the core layer, and CC is the coefficient of linear expansion of the core layer. The term "filling proportion of the skin layer" and the term "filling proportion of the core layer" mean the proportions of the areas of the skin layer and the core layer, respectively, in a section perpendicular to a longitudinal direction of the long molded article to the area of the section, which are expressed as percentages by weight.

The long sandwich molded article of the present invention, however, has a coefficient of linear expansion of as low as 40 to 60% of that calculated as the aforesaid additivity rule value. Such a low coefficient of linear expansion is preferably obtained with the ratio of the flexural modulus of the core layer to that of the skin layer being 3.0 or more.

Thus, the long molded article of the present invention can be given a low coefficient of linear expansion by choosing the above materials for the skin layer and the core layer and preferably adjusting the above flexural modulus ratio to a value in the above range.

As described above, according to the present invention, there can be obtained a long sandwich molded article which is excellent not only in attractiveness after mounting and dimensional stability but also in scratch resistance and product attachability.

EXAMPLES 3 to 3 and COMPARATIVE EXAMPLES 1 to 3

Embodiments of the present invention are explained below with reference to FIGS. 1 to 5.

Figure 2:
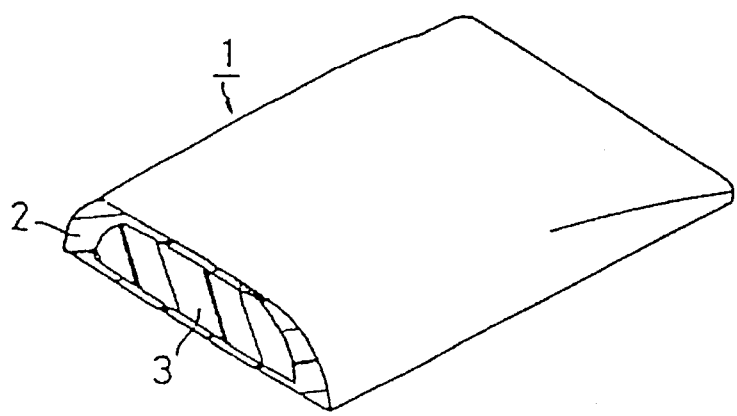
FIG. 2 is a perspective view of the side molding of FIG. 1.

FIG. 2 is a partial perspective view of a side molding 1 of each of the present examples.

Figure 3:
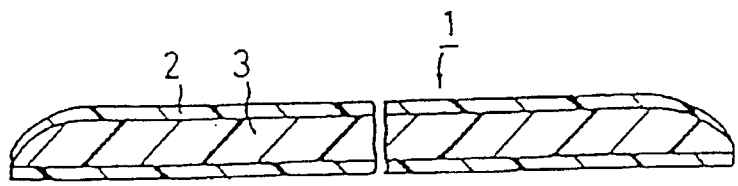
FIG. 3 is a vertical cross-sectional view of the side molding of FIG. 1.

FIG. 3 is a vertical cross-sectional view of the side molding 1.

The side molding 1 of each present example is long and has a semicylindrical shape in section, and a two-layer structure including a skin layer 2 and a core layer 3.

The skin layer 2 is formed of a styrene-based thermoplastic elastomer composed mainly of SEBS. On the other hand, the core layer 3 is formed of each of the resin compositions composed mainly of PP (polypropylene) which are described hereinafter.

Figure 4:
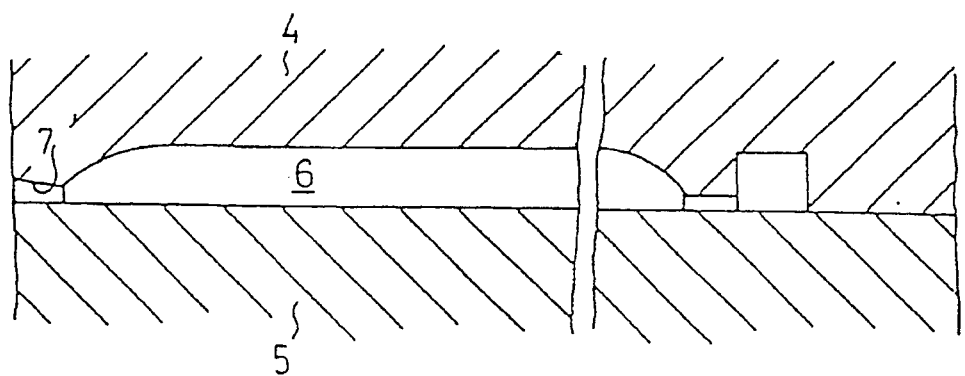
FIG. 4 is a cross-sectional view of a mold for explaining a process for producing said side molding.
Figure 5:
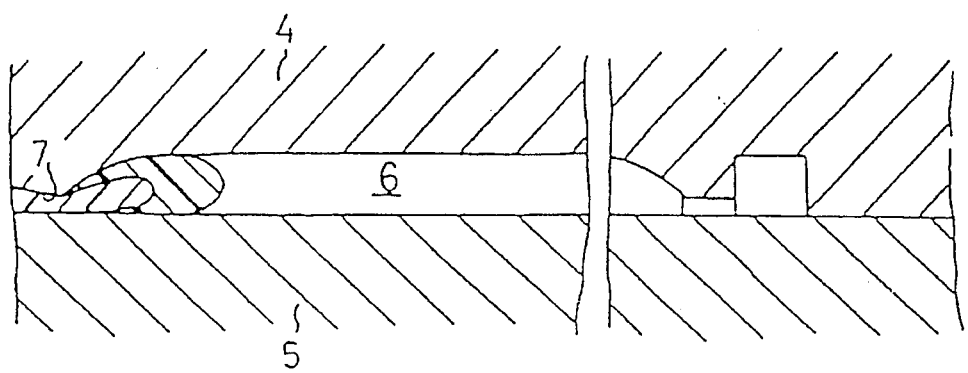
FIG. 5 is a cross-sectional view of a mold which shows a resin injected into the cavity of the mold shown in FIG. 4.

The side molding 1 is formed by a conventional sandwich molding method. FIG. 4 shows a long cavity 6 corresponding to the shape of the side molding is formed using a fixed mold 4 placed on the upper side in FIG. 4 and a movable mold 5 placed on the lower side in FIG. 4. FIG. 5 the resin for forming the skin layer 2 is injected into the cavity 6 through a gate 7 provided at one end of the cavity 6 in the lengthwise direction of the cavity 6. Several seconds after the injection, the resin composition for forming the core layer 3 is injected into the cavity 6. The above procedure, allows the resin for forming the skin layer 2 to be pushed by the resin composition for forming the core layer 3 to flow in the cavity 6 from left to right in FIG. 5. Lastly, the resin for forming the skin layer 2 is injected into the cavity 6 again, after which the resin and the resin composition are cooled and solidified. The thus-solidified skin layer and core layer reach the states shown in FIG. 1, respectively. The movable mold 5 is moved downward in FIG. 1 and the molded product is removed using a device (not shown) provided in the fixed mold 4, whereby the side molding 1 can be obtained.

In the present examples and comparative examples, by varying the composition of the core layer 3 composed mainly of PP, 4 kinds of core layers 3 (cores A, B, C and D) were prepared. Their compositions are shown in Table 1. As the PP, there were used two block PP's (1 ... BC-03C and 2 ... BC-05C, trade names, mfd. by Mitsubishi Petrochemical Co., Ltd.) and a modified PP (QE-050, a trade name, mfd. by Mitsui Petrochemical Industries Ltd.). As ethylene-α-olefin copolymers, there were used three copolymers (EP911P, EP02P and EP07P, trade names, mfd. by Japan Synthetic Rubber Co., Ltd.). As additives, there were used potassium titanate whisker (Tismo D, a trade name, mfd. by Otsuka Chemical Co.), talc (LMR#100 and LMS#100, trade names, mfd. by Fuji Talk Co.), and glass fiber (CS-03MA486A, a trade name, mfd. by Asahi Fiber Glass Co., Ltd.). The unit of all the figures in Table 1 is % by weight.

TABLE 1

|  | Core A | Core B | Core C | Core D |
|---|---|---|---|---|
| Block PP | 35*1 | 35*1 | 65*2 | 35*1 |
| Modified pp | — | — | — | — |
| Ethylene EP911P | 40 | — | — | — |
| α-olefin EP02P | — | — | — | — |
| copolymer EP07P | — | — | — | — |
| Whicker | 5 | 5 | — | — |
| Talc |  |  |  |  |
| LMR #100 | 20 | 20 | — | — |
| LMS #100 | — | — | — | 25 |
| Glass Fiber | — | — | — | — |
| Flexural modulus (kg/cm$^2$) | 5800 | 5500 | 5400 | 8500 |

On the other hand, the skin layer 2, was styrene-based thermoplastic elastomer (Rubberon SJ9400, a trade name, mfd. by Mitsubishi Petrochemical Co., Ltd.; flexural modulus 1,200 kg/cm). Side moldings 1 were produced in the manner described above by varying the materials, and their performance characteristics were evaluated. The results obtained are shown in Table 2.

TABLE 2

|  |  | Example 1 | Example 2 | Example 3 | Comparative Example 1 | Comparative Example 2 | Comparative Example 3 |
|---|---|---|---|---|---|---|---|
| Core layer | Kind | Core A | Core B | Core D | Core C | Core A | None |
|  | Aspect ratio | 5 or more | less than 5 | 5 or more | — | 5 or more | — |
| Skin layer | Kind | RABALON SJ9400 | RABALON SJ9400 | RABALON SJ9400 | RABALON SJ9400 | None | RABALON SJ9400 |
| Performance characteristics of product | Resistance to warping | ○ | ○ | ○ | x | ○ | ○ |
|  | Attachability | ○ | ○ | ○ | x | ○ | Δ |
|  | Scratch resistance | ○ | ○ | ○ | ○ | Δ | ○ |
|  | Coefficient of linear expansion | ○ (3.3) | ○ (4.7) | ○ (3.5) | ○ (2.6) | ○ (3.4) | x (12.0) |

Note: The aspect ratio is of the ethylene-olefin copolymer forming an islands phase in PP.
The rating (mark) shown in the table is as follows: ○ ... good, Δ ... slightly inferior, x ... poor.

Table 2, shows for Examples 1 to 3 satisfying the requirements of the present invention, the scratch resistance was, of course, high, performance characteristics substantially equal to those of the core material alone could be attained with respect to the coefficient of linear expansion, and the attractiveness and the dimensional stability were also excellent. Particularly when the aspect ratio of dispersed phase of the core layer 3 was 5 or more, satisfactory results could be obtained. Furthermore, since the core layer 3 was formed by sandwich molding, a proper stiffness could be attained and the product attachability was excellent.

On the other hand, a side molding composed of 100% of a material for skin layer (Comparative Example 3) had a large coefficient of linear expansion and unsatisfactory attractiveness and dimensional stability. Moreover, since the flexural modulus of said material was low, the side molding was slightly inferior in product attachability.

A side molding composed of 100% of a material for core layer (comparative Example 2) had a small coefficient of linear expansion and was not warped. Therefore, it had satisfactory product attachability, attractiveness and dimensional stability. But, it was easily scratched because the matrix component was PP.

When blended glass fiber was used but not an ethylene-α-olefin copolymer (Comparative Example 1), the resulting side molding had a small coefficient of linear expansion but was greatly warped and poor in product attachability.

EXAMPLES 4 to 12 and COMPARATIVE EXAMPLES C1 to C6

Examples of the present invention are explained below together with comparative examples.

Side moldings for automobile were sandwich-molded as long sandwich molded articles, and their coefficient of linear expansion, scratch resistance, etc. were tested.

Figure 6:
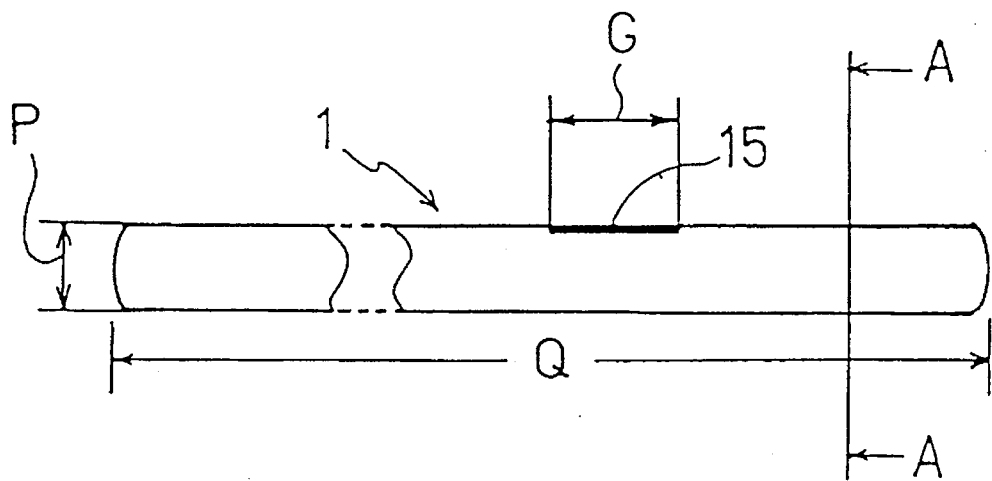
FIG. 6 is a schematic view of a side molding obtained in each of Examples 4 to 12 of the present invention.
Figure 7:
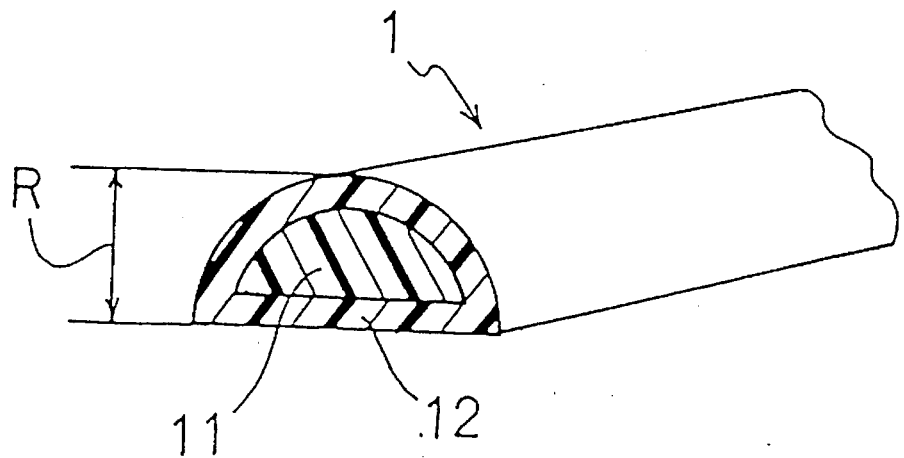
FIG. 7 is a cross-sectional view of the side molding shown in FIG. 6, which was taken along the line A—A shown by the arrows.

As shown in FIG. 6 and FIG. 7, said side moldings 1 were long sandwich molded articles composed of a skin layer 12 and a core layer 11 coated with the skin layer 12. The side moldings 1 had a length Q of 110 cm, a height R of 5 mm and a bottom width P of 3 cm. Their upper part was semicylindrical. The width G of a film gate 15 at the time of molding the side molding 1 was about 4.5 cm.

The above sandwich side moldings 1 were obtained by sandwich injection molding. In detail, they were molded by injecting a softened material for the skin layer into the cavity of a mold at first, thereafter injecting a softened material for the core layer into the material for the skin layer, and then cooling the materials in the cavity.

Tables 3 and 4 show the material for the skin layer, the material for the core layer, and characteristics of the thus-molded side moldings molded.

In these tables, the material names (skins A to F and cores K to Q) in the "Material for skin layer" section and "Material for core layer" section refer to the materials described hereinafter which were used in the examples or the comparative examples. Table 4 also shows the flexural modulus and coefficient of linear expansion of the material for the skin layer and the material for the core layer, and the ratio of the flexural modulus of the material for the core layer to that of the material for the skin layer.

Table 4 further shows the filling proportion of the core layer in the side moldings obtained, their coefficient of linear expansion W calculated according to the additivity rule, the measured coefficient of linear expansion Y of each side molding, the difference between W and Y (W−Y), and the scratch resistance, resistance to warping and product attachability of the side moldings. As to the scratch resistance, resistance to warping, and product attachability, the rating (mark) shown in Table 4 was as follows: ○: satisfactory, x: not acceptable, Δ: intermediate between them.

The aforesaid materials for the skin layer (skins A to F) are as follows:

(1) Skin A; an olefin-based thermoplastic elastomer Milastomer 9590B (mfd. by Mitsui Petrochemical Industries Ltd.).

(2) Skin B; an olefin-based thermoplastic elastomer Milastomer 9070B (mfd. by Mitsui Petrochemical Industries Ltd.).

(3) Skin C; a polyester thermoplastic elastomer Pelprene S-6001 (Toyobo Co., Ltd.)

(4) Skin D; a polyester thermoplastic elastomer Pelprene S-1001 (Toyobo Co., Ltd.).

(5) Skin E; a styrene-based thermoplastic elastomer RABALON SJ9400B (mfd. by Mitsubishi; Petrochemical Co., Ltd.)

(6) Skin F; a urethane-based thermoplastic elastomer Pandex T-1190 (mfd. by Dainippon Ink and Chemicals, Inc.)
The aforesaid materials for the core layer (cores K to Q) are listed in Table 3.

Table 3 tabulations of the proportions of components of the matrix phase, dispersed phase and filler of the materials for the core layer, and the aspect ratio of the dispersed phase.

The proportions of the components are shown as parts by weight. Therefore, the sum of the matrix phase and the dispersed phase is 100 parts by weight.

TABLE 3

| | | | Composition of a material for core layer | | | | | | |
|---|---|---|---|---|---|---|---|---|---|
| | | | Unit: parts by weight | | | | | | |
| | | | Core K | Core L | Core M | Core N | Core O | Core P | Core Q |
| Matrix phase | Block PP | BC-03F | 46.7 | 40 | 46.7 | 46.7 | | 46.7 | |
| | | BC-05C | | | | | 92.9 | | |
| | | BC-03C | | | | | | | 46.7 |
| | Maleic anhydride-modified PP | QE-050 | | 6.7 | | | 7.1 | | |
| | Polyolefin type polyol | Polytail H | | | | 6.7 | | | |
| Dispersed phase | Ethylene-α-olefin copolymer | EP-911P | 53.3 | 53.3 | 53.3 | | | | |
| | | EP-G7P | | | | | | 53.3 | |
| | | EP-02P | | | | | | | 53.3 |
| | SEBS | KRATON G1657 | | | | 53.3 | | | |
| Filler | Potassium titanate wisker | Tismo D | 6.7 | 6.7 | 6.7 | 6.7 | | 6.7 | |
| | Talc | LMR #100 | 26.7 | 26.7 | 26.7 | 26.7 | | 26.7 | |
| | | LMS #100 | | | | | | | 33.4 |
| | Glass fiber | CS03MA486A | | | | | 42.9 | | |
| | Aspect ratio of dispersed phase | | >5 | >5 | >5 | >5 | — | <5 | >5 |

The polypropylene resin used as matrix phase in Table 3 are described below.

(1) Block PP (a polypropylene resin): BC-03F (mfd. by Mitsubishi Petrochemical Co., Ltd.)

(2) Block PP; BC-03C (mfd. by Mitsubishi Petrochemical Co., Ltd.)

(3) Block PP; BC-05C (mfd. by Japan Synthetic Rubber Co., Ltd.)

The modified polyolefin resins used as matrix phase in Table 3 are described below.

(1) Maleic-anhydride-modified PP; QE-050 (mfd. by Mitsui Petrochemical Industries Ltd.)

(2) Polyolefin type polyol; Polytail H (mfd. by Mitsubishi Chemical Industries Ltd.)

The components of the dispersed phase are described below.

(1) Ethylene-α-olefin copolymer; EP-911P (mfd. by Japan Synthetic Rubber Co., Ltd.).

(2) Ethylene-α-olefin copolymer; EP-02P (mfd. by Japan Synthetic Rubber Co., Ltd.).

(3) Ethylene-α-olefin copolymer; EP-07P (mfd. by Japan Synthetic Rubber Co., Ltd.).

(4) SEBS (as a styrene-based thermoplastic elastomer component); KRATON G1657 (mfd. by Shell Chemical Co.).

The filler components are described below.

(1) Potassium titanate whisker; Tismo D (mfd. by Otsuka Chemical, Co.

(2) Talc; LMR#100 (mfd. by Fuji Talc, Co.).

(3) Talc; LMS#100 (mfd. by Fuji Talc, Co.).

(4) Glass Fiber; CS03MA486A (mfd. by Asahi Fiber Glass Co.).

TABLE 4

| | Measured values | | | | | | | | |
|---|---|---|---|---|---|---|---|---|---|
| | Comparative Example | | | Example | | | Comparative Example | Example | |
| | C1 | C2 | C3 | 4 | 5 | 6 | C4 | 7 | 8 |
| Material for skin layer | | | | | | | | | |
| Material name | Skin A | The same as left | | Skin B | The same as left | | Skin C | Skin D | Skin E |
| Flexural modulus (kg/cm$^2$) | 3500 | | | 1000 | | | 5500 | 1200 | 1200 |
| Coefficient of linear expansion (×10$^{-5}$ cm/cm.°C.) | 12 | | | 13 | | | 14 | 19 | 13 |
| Material for core layer | | | | | | | | | |
| Material name | Core K | | | Core K | | | Core L | Core L | Core K |
| Flexural modulus (kg/cm$^2$) | 5800 | | | 5800 | | | 6000 | 6000 | 5800 |
| Coefficient of linear expansion (×10$^{-5}$ cm/cm.° C.) | 3.4 | | | 3.4 | | | 3.5 | 3.5 | 3.4 |
| Flexural modulus ratio of core layer to skin layer | 1.6 | | | 5.8 | | | 1.1 | 5 | 4.8 |
| Characteristics of molding | | | | | | | | | |
| Filling proportion of core layer (% by weight) | 50 | 30 | 15 | 50 | 30 | 15 | 50 | 50 | 50 |
| Coefficient of linear expansion calculated according to the additivity rule W × 10$^{-5}$ cm/cm.°C. | 7.7 | 9.4 | 10.7 | 8.2 | 10.1 | 11.6 | 8.8 | 11.2 | 8.2 |
| Measured coefficient of linear expansion Y × 10$^{-5}$ cm/cm.°C. | 6.8 | 8.6 | 10.1 | 3.2 | 5.3 | 6.9 | 8.4 | 4.8 | 3.3 |
| Difference between coefficients of linear expansion (W−Y) × 10$^{-5}$ cm/cm.°C. | 0.9 | 0.8 | 0.6 | 5.0 | 4.8 | 4.7 | 0.4 | 6.4 | 4.9 |
| Scratch resistance | ○ | ○ | ○ | ○ | ○ | ○ | ○ | ○ | ○ |
| Resistance to warping | ○ | ○ | ○ | ○ | ○ | ○ | ○ | ○ | ○ |
| Product attachability | ○ | ○ | ○ | ○ | ○ | ○ | ○ | ○ | ○ |

| | Example | | | Comparative Example | | Example |
|---|---|---|---|---|---|---|
| | 9 | 10 | 11 | C5 | C6 | 12 |
| Material for skin layer | | | | | | |
| Material name | Skin E | Skin F | Skin B | Skin B | — | Skin E |
| Flexural modulus (kg/cm$^2$) | 1200 | 1000 | 1000 | 1000 | — | 1200 |
| Coefficient of linear expansion (×10$^{-5}$ cm/cm.°C.) | 13 | 15 | 13 | 13 | — | 13 |
| Material for core layer | | | | | | |
| Material name | Core P | Core M | Core N | Core O | Core K | Core Q |
| Flexural modulus ((kg/cm$^2$) | 5600 | 5200 | 5400 | 50000 | 5800 | 8500 |
| Coefficient of linear | 4.6 | 3.8 | 3.6 | 2.0 | 3.4 | 3.3 |

TABLE 4-continued

| | Measured values | | | | | |
|---|---|---|---|---|---|---|
| expansion ($\times 10^{-5}$ cm/cm.°C.) | | | | | | |
| Flexural modulus ratio of core layer to skin layer | 4.7 | 5.2 | 5.4 | 5 | — | 7.0 |
| Characteristics of molding | | | | | | |
| Filling proportion of core layer (% by weight) | 50 | 50 | 50 | 50 | 100 | 50 |
| Coefficient of linear expansion calculated according to the additivity rule $W \times 10^{-5}$ cm/cm.°C. | 8.8 | 9.4 | 8.3 | 7.5 | — | 8.25 |
| Measured coefficient of linear expansion $Y \times 10^{-5}$ cm/cm.°C. | 4.7 | 4.3 | 4.5 | 2.6 | 3.4 | 3.5 |
| Difference between coefficients of linear expansion $(W-Y) \times 10^{-5}$ cm/cm.°C. | 4.1 | 5.1 | 3.8 | 4.9 | — | 4.75 |
| Scratch resistance | ○ | ○ | ○ | ○ | Δ | ○ |
| Resistance to warping | ○ | ○ | ○ | x | ○ | ○ |
| Product attachability | ○ | ○ | ○ | x | Δ | ○ |

As can be seen from Table 4, the side moldings of Examples 4 to 12 of the present invention have a measured coefficient of linear expansion of as low as $3.2$–$6.9 \times 10^{-5}$ cm/cm.° C. On the other hand, the side moldings of Comparative Examples C1 to C4 have a measured coefficient of linear expansion of as high as $6.8$–$10.1 \times 10^{-5}$ cm/cm.° C. because the ratio of the flexural modulus of the core layer to that of the skin layer is as low as 1.6 or 1.1.

Comparative Example C5 uses a flexural modulus ratio of 5 but the material for the core layer contains no dispersed phase (code 0 in Table 3). Therefore, the side molding of Comparative Example 5 has a low coefficient of linear expansion but has poor resistance to warping and product attachability (the mark X in Table 4).

The side molding of Comparative Example C6 includes only a core layer without a skin layer. This side molding is insufficient in scratch resistance and product attachability.

The additivity rule value W, of the coefficient of linear expansion, its measured value Y and the difference between them (W–Y) are shown together in Table 4. A method for calculating the additivity rule value was described above. Table 4 shows that the additivity rule value W is between $7.7$–$11.6 \times 10^{-5}$ cm/cm.° C. in both Examples and Comparative Examples other than Comparative Example C5 (wherein no dispersed phase was used) and Comparative Example C6 (wherein no skin layer was formed).

Examples 4 to 12 of the present invention, show that the measured value Y is low as described above, and the value of W–Y is as large as 3.8 to 6.4.

As described above, according to the present invention, there can be obtained a long sandwich molded article which as a whole has a low coefficient of linear expansion and excellent attractiveness after mounting and dimensional stability.

Furthermore, there can be obtained a long sandwich molded article which has high scratch resistance and product attachability and is free from warping.

Figure 8:
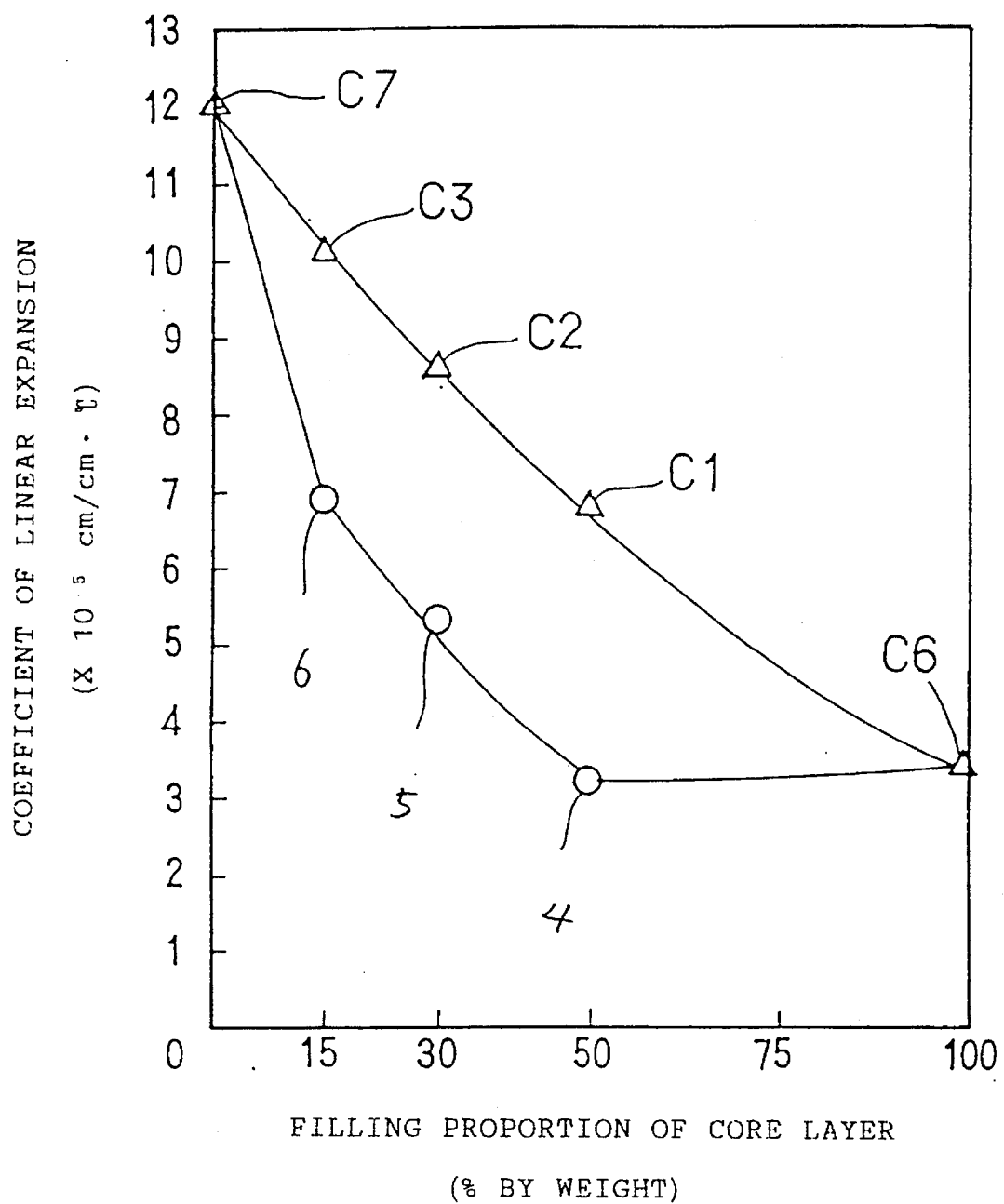
FIG. 8 is a graph showing the relationship between the filling proportion of a core layer and the coefficient of linear expansion in Examples 4 to 6 and Comparative Examples C1 to C3.

FIG. 8 shows the relationship between the filling properties of the core layer and the coefficient of linear expansion in graphical form for Examples 4 to 6 and Comparative Examples C1 to C3.

In FIG. 8, the above relationship is shown also for Comparative Example C6 [a side molding composed of a core layer alone (filling proportion: 100%)] and Comparative Example C7 [a side molding composed a skin layer alone]. In Comparative Example C7, there was used only the same material for skin layer as in Examples 4 to 6.

As can be seen from FIG. 8, the values of coefficient of linear expansion of the side moldings of Comparative Examples C1 to C3 are a little lower than corresponding values on a straight line connecting the points obtained for Comparative Example C6 (filling proportion of core layer 100%) and Comparative Example C7 (filling proportion of core layer 0%, a skin layer alone), respectively.

By contrast, the values of coefficient of linear expansion of the side moldings of Examples 4 to 6 of the present invention are fairly lower than those of the side moldings of Comparative Examples C1 to C3, respectively, in which the same filling proportions as in Examples 4 to 6, respectively, were used. This is because the above-mentioned flexural modulus ratio is adjusted to 3.0 or more in the present invention.

What is claimed is:

1. A long molded article comprising:

a skin layer comprising a thermoplastic elastomer, and a core layer coated with said skin layer which comprises:

a) 30 to 70% by weight of a matrix phase comprising a polypropylene resin, and b) 70 to 30% by weight of one dispersed phase selected from the group consisting of ethylene-α-olefin copolymers and styrene-based thermoplastic elastomers, wherein the ratio of the flexural modulus of said core layer to that of said skin layer is 3.0 or more.

2. A long molded article according to claim 1, wherein said thermoplastic elastomer is a styrene-based thermoplastic elastomer.

3. A long molded article according to claim 2, wherein said long molded article is a side molding.

4. A long molded article according to claim 1, wherein said dispersed phase has a shape of a string having an aspect ratio of at least 5.

5. A long molded article according to claim 4, wherein said core layer contains at least one kind of filler in an amount of 1 to 40% by weight.

6. A long molded article according to claim 1, wherein the coefficient of linear expansion of said skin layer is in the range of $10\times10^{-5}$ to $20\times10^{-5}$ cm/cm °C. and the coefficient of linear expansion of said core layer is $10\times10^{-5}$ cm/cm °C. or less.

7. A long molded article according to claim 1, wherein the polypropylene resin has an ethylene unit content between 0 and 15%.

8. A long molded article according to claim 1, wherein said dispersed phase comprises an ethylene-α-olefin copolymer having a Mooney viscosity $ML_{1+4}$ (100° C.) of less than 70.

9. A long molded article according to claim 1, wherein said dispersed phase comprises an ethylene-α-olefin copolymer having an α-olefin comonomer selected from the group consisting of propylene, butene-1, hexene-1, decene-1, 4-methylbutene-1, 4-methylpentene, and mixtures thereof.

10. A long molded article according to claim 1, wherein said dispersed phase comprises a styrene-based thermoplastic elastomer selected from the group consisting of styrene-ethylene-butylene-styrene block copolymers, styrene-butadiene-styrene block copolymers, styrene-isoprene-styrene block copolymers, and styrene-ethylene-propylene copolymers.

11. A long molded article according to claim 1, wherein the flexural modulus of said core layer is between 2,000 and 10,000 kg/cm².

12. A long molded article according to claim 1, wherein the filling proportion of said core layer is between 10% and 90%.

13. A long molded article according to claim 1, wherein the coefficient of linear expansion of said long molded article is in the range of $2\times10^{-5}$ to $8\times10^{-5}$ cm/cm °C.

* * * * *